United States Patent
Sano et al.

(10) Patent No.: US 10,646,794 B2
(45) Date of Patent: May 12, 2020

(54) SOLID-LIQUID SEPARATION DEVICE

(71) Applicant: HITACHI, LTD., Tokyo (JP)

(72) Inventors: Tadashi Sano, Tokyo (JP); Mitsuhiro Matsuzawa, Tokyo (JP); Sachio Sekiya, Tokyo (JP); Yoko Kokugan, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 64 days.

(21) Appl. No.: 15/537,691

(22) PCT Filed: Jan. 23, 2015

(86) PCT No.: PCT/JP2015/051751
§ 371 (c)(1),
(2) Date: Jun. 19, 2017

(87) PCT Pub. No.: WO2016/117100
PCT Pub. Date: Jul. 28, 2016

(65) Prior Publication Data
US 2018/0001226 A1    Jan. 4, 2018

(51) Int. Cl.
*B01D 12/00* (2006.01)
*B01J 20/34* (2006.01)
(Continued)

(52) U.S. Cl.
CPC ............ *B01D 12/00* (2013.01); *B01D 1/2856* (2013.01); *B01D 3/007* (2013.01); *B01D 11/02* (2013.01);
(Continued)

(58) Field of Classification Search
CPC ...... B01D 12/00; B01D 1/2856; B01D 3/007; B01D 3/40; B01D 11/02; B01D 11/0296;
(Continued)

(56) References Cited

U.S. PATENT DOCUMENTS 2,461,389 A * 2/1949 Mitchell .................. B01L 7/00
122/406.1
3,070,463 A * 12/1962 Barday .................... B01D 1/00
134/11
(Continued)

FOREIGN PATENT DOCUMENTS

EP        1210161 A1    6/2002
JP       56-067503 A    6/1981
(Continued)

OTHER PUBLICATIONS

International Search Report, PCT/JP2015/051751, dated Apr. 28, 2015, 2 pgs.
(Continued)

*Primary Examiner* — Youngsul Jeong
*Assistant Examiner* — Gabriel E Gitman
(74) *Attorney, Agent, or Firm* — Volpe and Koenig, P.C.

(57) ABSTRACT

A solid-liquid separation device performs dehydration or deoiling from a treated object using a substance A that is a gas at normal temperature and pressure and is capable of dissolving water and oil when liquefied. The separation device includes a substance B that circulates while generating phase change in a closed system, a compressor that compresses the substance B, a first heat exchanger that condenses substance B and evaporates of the substance A, an expansion valve that decompresses the condensed substance B, a second heat exchanger that evaporates substance B and condenses substance A, and a treatment tank wherein substance A is mixed with the treated object, substance A is evaporated while separated from the liquid in the first heat exchanger, and condensed in the second heat exchanger. The center of gravity of the first heat exchanger is lower than the second heat exchanger in a vertical direction.

10 Claims, 2 Drawing Sheets

(51) Int. Cl.
- *C02F 11/14* (2019.01)
- *B01D 1/28* (2006.01)
- *F26B 5/00* (2006.01)
- *B01D 11/02* (2006.01)
- *B01D 3/00* (2006.01)
- *F26B 5/16* (2006.01)
- *B01D 3/40* (2006.01)
- *C02F 1/28* (2006.01)

(52) U.S. Cl.
CPC ....... *B01J 20/3416* (2013.01); *B01J 20/3475* (2013.01); *C02F 11/14* (2013.01); *F26B 5/00* (2013.01); *F26B 5/16* (2013.01); *B01D 3/40* (2013.01); *B01D 11/0296* (2013.01); *B01J 20/34* (2013.01); *C02F 1/283* (2013.01); *C02F 2209/42* (2013.01); *C02F 2303/16* (2013.01)

(58) Field of Classification Search
CPC .... B01J 20/34; B01J 20/3416; B01J 20/3475; F26B 5/00; F26B 5/16; C02F 11/14; C02F 2303/16; C02F 1/283
See application file for complete search history.

(56) References Cited

U.S. PATENT DOCUMENTS

| | | | | |
|---|---|---|---|---|
| 4,136,065 A | * | 1/1979 | Yano | A23F 3/423 512/5 |
| 4,437,940 A | * | 3/1984 | Sussmeyer | B01D 1/14 159/DIG. 2 |
| 4,805,410 A | * | 2/1989 | Johnston | F01K 9/00 60/651 |
| 5,458,739 A | * | 10/1995 | Boucher | B01D 1/02 202/153 |
| 2002/0182722 A1 | * | 12/2002 | Corr | B01D 1/2846 435/309.1 |
| 2005/0210701 A1 | | 9/2005 | Kanda et al. | |
| 2006/0063663 A1 | * | 3/2006 | Wolff | B01D 53/02 502/60 |
| 2007/0068792 A1 | * | 3/2007 | Jang | B01D 3/146 203/14 |
| 2009/0166175 A1 | * | 7/2009 | Waibel | B01D 3/007 203/49 |
| 2010/0101928 A1 | | 4/2010 | Kanda et al. | |
| 2014/0158520 A1 | | 6/2014 | Somlyai | |
| 2014/0252699 A1 | * | 9/2014 | Sakaguchi | B01D 53/1418 266/155 |
| 2015/0336829 A1 | * | 11/2015 | Mochizuki | C02F 1/28 202/181 |

FOREIGN PATENT DOCUMENTS

| | | |
|---|---|---|
| JP | 2013-203760 A | 10/2013 |
| JP | 2014-522723 A | 9/2014 |
| WO | 01/17647 A1 | 3/2001 |
| WO | 2003/101579 A1 | 12/2003 |
| WO | 2008/111483 A1 | 9/2008 |
| WO | 2015/015631 A1 | 2/2015 |
| WO | 2015/033455 A1 | 3/2015 |

OTHER PUBLICATIONS

Extended European Search Report dated Jul. 3, 2018 for the European Patent Application No. 15878793.7.

* cited by examiner

SOLID-LIQUID SEPARATION DEVICE

TECHNICAL FIELD

The present invention relates to a solid-liquid separation device that separates a liquid and a solid.

BACKGROUND ART

There are [PTL 1] and [PTL 2] as background arts of the present technical field.

[PTL 1] discloses a configuration to remove moisture from coal containing moisture, using a cycle of phase change of a substance A that is a gas at normal temperature and pressure and is capable of dissolving water and oil in a liquefied state.

PTL 2: discloses a heat source used for a cycle of phase change of a substance A and a method of using the heat source.

CITATION LIST

Patent Literature

PTL 1: WO 2003/101579
PTL 2: WO 2008/111483

SUMMARY OF INVENTION

Technical Problem

There are various substances A that are gases at normal temperature and pressure and can dissolve water and oil when liquefied. [PTL 1] is disclosed as a solid-liquid separation technique using characteristics of the substance A. In [PTL 1], dimethyl ether (DME) is selected as an example of the substance A, and is used for removal of moisture in coal. Here, a compressor is used to change a phase of DME, and an oil-free compressor needs to be selected as the compressor used here. Models of the oil-free compressor include a turbo refrigerator, a screw refrigerator, and a reciprocating refrigerator. However, no commercially appropriate compressors exist for the solid-liquid separation using the substance A because of problems such as too large minimum processing amount and a short maintenance interval.

To efficiently operate the DME cycle, the amount of DME circulated in the cycle needs to be appropriately maintained. However, if the amount of DME in the cycle is large, a liquid phase unfavorable for heat exchange occurs in a heat exchanger. On the other hand, in a case where the amount of DME is small, a gas-liquid two-phase flow occurs in a position where the phase is supposed to be a liquid phase in the cycle, and efficiency of the cycle is decreased. Therefore, an enclosed amount of DME in the cycle to highly efficiently operate the cycle has a very narrow range of appropriate amount. However, the appropriate amount in the cycle needs to be comprehensively calculated using a P-H diagram from measured temperature/pressure/flow rate, and the like, and precise grasping and control of the amount of DME in the cycle is difficult.

[PTL 2] discloses a configuration to use heat of an external environment for supply of heat of condensation and heat of evaporation of DME. In a method depending on an outside for a heat source, the efficiency of this method is substantially decreased if an external medium of temperature necessary for the phase change cycle of DME cannot be sufficiently obtained. Further, even if the external medium of appropriate temperature can be obtained, sensible heat of the external heat source is used, and thus the heat exchange efficiency is lower than that of [PTL 1], and the heat exchanger needs to be increased in size. Further, in the case of using the external medium depending on an environment as the heat source, impurities are often contained, and which cause pollution and blockage on an external medium side of the heat exchanger and decrease the heat exchange efficiency. Therefore, highly frequent maintenance is required.

Therefore, the present invention provides a solid-liquid separation device that can perform phase change of a substance A in a highly efficient manner with low maintenance frequency.

Solution to Problem

To solve the above problem, the present invention is a solid-liquid separation device that performs dehydration or deoiling from an object to be treated that is a mixture of water and a solid, a mixture of oil and a solid, or a mixture of water, oil, and a solid, as the object to be treated, using a substance A capable of dissolving water and oil, the solid-liquid separation device including a substance B that is circulated while generating phase change in a closed system, a compressor that compresses the substance B, a first heat exchanger that exchanges heat of condensation of the substance B and heat of evaporation of the substance A, expansion means that decompresses the condensed substance B, a second heat exchanger that exchanges heat of evaporation of the substance B and heat of condensation of the substance A, and a treatment tank in which the substance A is mixed with the object to be treated, the substance A having been evaporated while separated from the water or the oil in the first heat exchanger, and condensed in the second heat exchanger, wherein a center of gravity of the first heat exchanger is installed in a lower portion than a center of gravity of the second heat exchanger in a vertical direction. Further, the present invention is characterized in that a flow path of the substance B is installed below a liquid level of the substance A in the first heat exchanger in the solid-liquid separation device.

Further, the present invention is characterized that a flow path of the substance B is installed above a liquid level of the substance A in the second heat exchanger in the solid-liquid separation device.

Further, the present invention is characterized in that a gas-liquid separator is installed in an upper portion of the first heat exchanger and downstream of a flow path of the substance A in the solid-liquid separation device.

Further, the present invention is characterized in that a gas-liquid separator is installed in a lower portion of the second heat exchanger and downstream of a flow path of the substance A in the solid-liquid separation device.

Further, the present invention is characterized in that a liquid feed pump for the substance A is installed in a lower portion of the first heat exchanger and the second heat exchanger in the vertical direction in the solid-liquid separation device.

Further, to solve the above problem, the present invention is a solid-liquid separation method of performing dehydration or deoiling from an object to be treated that is a mixture of water and a solid, a mixture of oil and a solid, or a mixture of water, oil, and a solid, as the object to be treated, using a substance A capable of dissolving water and oil, the solid-liquid separation method including a substance B that is circulated while generating phase change in a closed system, compressing the substance B, exchanging heat of condensation of the substance B and heat of evaporation of the substance A by a first heat exchanger, decompressing the condensed substance B, exchanging heat of evaporation of the substance B and heat of condensation of the substance A by a second heat exchanger, and mixing the substance A with the object to be treated, the substance A having been evaporated while separated from the water or the oil in the first heat exchanger, and condensed in the second heat exchanger, and installing a center of gravity of the first heat exchanger in a lower portion than a center of gravity of the second heat exchanger in a vertical direction.

Further, the present invention is characterized in that a flow path of the substance B is installed below a liquid level of the substance A in the first heat exchanger in the solid-liquid separation method.

Further, the present invention is characterized in that a flow path of the substance B is installed above a liquid level of the substance A in the second heat exchanger in the solid-liquid separation method.

Further, the present invention is characterized in that a gas-liquid separator is installed in an upper portion of the first heat exchanger and downstream of a flow path of the substance A in the solid-liquid separation method.

Further, the present invention is characterized in that a gas-liquid separator is installed in a lower portion of the second heat exchanger and downstream of a flow path of the substance A in the solid-liquid separation method.

Further, the present invention is characterized in that a liquid feed pump for the substance A is installed in a lower portion of the first heat exchanger and the second heat exchanger in the vertical direction in the solid-liquid separation method.

Advantageous Effects of Invention

According to the present invention, among devices that perform solid-liquid separation, using a cycle of phase change of a substance A that is a gas at normal temperature and pressure, a solid-liquid separation device can be provided, which can perform the phase change of the substance A in an appropriate treatment amount, can extend an maintenance interval of the device, and can perform highly-efficient operation that enables easily grasping and control of the amount of the substance A in the cycle.

DESCRIPTION OF EMBODIMENTS

Hereinafter, embodiments of the present invention will be described with reference to the drawings.

First Embodiment

A solid-liquid separation device and a method thereof of the present invention can individually separate a mixture of a solid, water, and oil into a solid, water, and oil. Further, the solid-liquid separation device and the method can be used for a combination of a solid and water, and a combination of a solid and oil. To be specific, the solid-liquid separation device and the method can be applied to various types of solid-liquid separation such as separation of water, oil, and a solid of sludge generated in water treatment, purification of soil contaminated with oil, dehydration/deoiling from plankton, and desorption of impurities absorbed to activated carbon used in water treatment.

Hereinafter, an embodiment for implementing the solid-liquid separation device and the method thereof of the present invention will be described using an activated carbon regeneration device as an example. However, an application example of the present invention is not limited to the activated carbon regeneration device.

Figure 1:
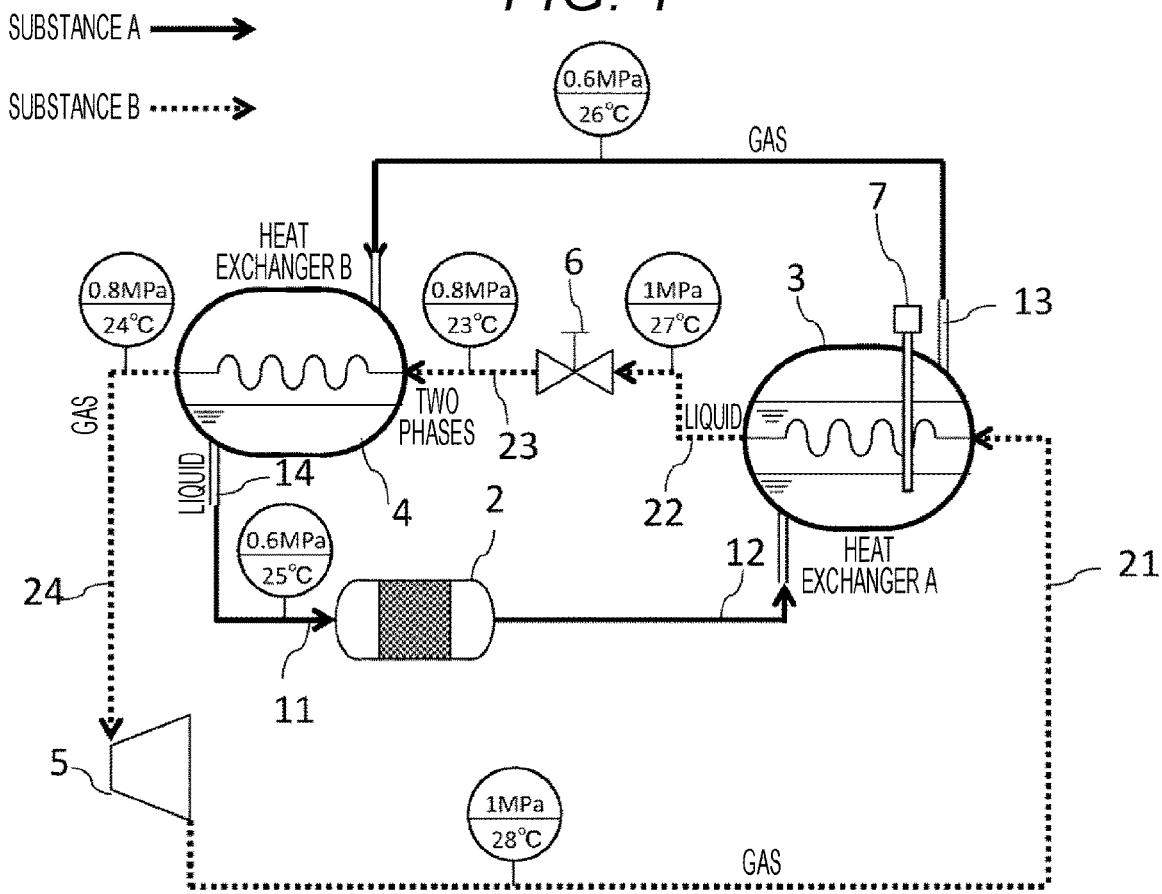
FIG. 1 is an embodiment of a configuration diagram of a solid-liquid separation device of the present invention.

A configuration of an activated carbon regeneration device that is one of application examples of the present invention will be described using FIG. 1. In the present embodiment, an example of using dimethyl ether (DME) as a substance A capable of dissolving water and oil, and fluorocarbon as a substance circulated while performing state change in a closed system (hereinafter, referred to as substance B) will be described. Further, an example of using shell and tube-type heat exchangers as two heat exchangers, and causing DME to pass through on the shell side in both the heat exchangers, will be described.

In the present embodiment, heat or cold heat necessary for phase change of DME is supplied using a refrigeration cycle of fluorocarbon. First, fluorocarbon becomes a high-temperature and high-pressure gas and is discharged from a compressor 5, and is sent through piping 21 into a tube of a heat exchanger 3. Here, the high-temperature fluorocarbon gas transfers heat of condensation to a DME side while being condensed, and thus shell-side liquefied DME uses the supplied heat as heat of evaporation to become a DME gas. Next, liquefied fluorocarbon that has become a liquid passes through piping 22, is sent to an expansion valve 6, and is decompressed at the time of passage, thereby to have the temperature and the pressure decreased, to become a two-phase flow, and is then sent through piping 23 to a tube side of a heat exchanger 4. Here, a shell-side high-temperature DME gas transfers heat of condensation to a fluorocarbon side while being condensed, and low-temperature liquefied fluorocarbon uses the supplied heat as heat of evaporation to become a fluorocarbon gas. Next, the fluorocarbon gas that has become a gas is sent through piping 24 to the compressor 5 and is compressed again, whereby a refrigeration cycle is formed.

Meanwhile, on the DME cycle side, first, the liquefied DME discharged from the shell side of the heat exchanger 4 is sent through piping 11 to the treatment tank 2 filled with used activated carbon. In the treatment tank 2, an organic matter, such as oil, absorbed to activated carbon is dissolved in DME together with adhering moisture. The organic matter and water are sent while kept dissolved in the liquefied DME to the heat exchanger 3 through piping 12. A larger amount of high-temperature fluorocarbon is continuously supplied to the heat exchanger 3 than the liquefied DME. Therefore, DME is heated by latent heat and sensible heat held by fluorocarbon, and the liquefied DME becomes a DME gas and is discharged. At this time, the water and the organic matter dissolved in the liquefied DME mostly stay in the heat exchanger 3 without being evaporated because the temperature is a boiling point or less. The discharged highly-pure DME gas is sent to the heat exchanger through piping 13. A larger amount of low-temperature fluorocarbon is continuously supplied to the heat exchanger 4 than the liquefied DME. Therefore, DME is cooled by the latent heat and sensible heat held by fluorocarbon, and the DME gas becomes a liquefied DME and is discharged.

The phase change cycle of DME of the present embodiment does not need fluid transfer means such as a compressor or a pump, and is characterized in use of gravity as drive force of the flow of DME. A principle of the characteristic will be described below. The center of gravity of the heat exchanger 4 is installed at a higher position than the center of gravity of the heat exchanger 3, and lower portions of both the heat exchangers 3 and 4 are coupled with piping through the treatment tank 2. Therefore, in a steady state, a liquid level of DME in the heat exchanger 4 and a liquid level of DME in the heat exchanger 3 are nearly equal. Here, when the DME gas is liquefied in the heat exchanger 4 by the operation of the fluorocarbon cycle, the liquefied DME is increased and thus the liquid level slightly rises. At this time, the liquid level of DME in the heat exchanger 4 becomes higher than the liquid level of DME in the heat exchanger 3. Therefore, immediately after that, the liquefied DME is spontaneously moved to the heat exchanger 3 side due to an influence of gravity such that the liquid levels become equal. Meanwhile, on the gas side of the DME cycle, the DME gas in the heat exchanger 4 is cooled by the refrigeration cycle of the substance B and is thus liquefied and decreased, and the liquefied DME is gasified by the refrigeration cycle of the substance B and the DME gas is thus increased in the heat exchanger 3. Therefore, a difference in internal pressure is caused between the heat exchanger 4 and the heat exchanger 3, but the two heat exchangers are connected through the piping 13. Therefore, the DME gas is moved to the heat exchanger 4 on a lower pressure side to decrease the difference in internal pressure between the heat exchangers. As described above, the present embodiment has a device configuration in which a circulation direction of the liquefied DME and a circulation direction of the DME gas accord with each other. Therefore, the phase change cycle of DME can be circulated only with transfer of heat.

When the operation continues, the concentration of water and the organic matter is gradually increased on the shell side of the heat exchanger 3, and the substance such as water that is not completely mixed starts to be extracted. An amount of increase of the extraction is large immediately after the operation. However, the amount of increase gradually approach 0 when a removal rate from activated carbon becomes high. Therefore, continuous measurement of the water level with a liquid level sensor 7 enables determination of termination of cleaning of activated carbon.

As for installation positions of the two heat exchangers in a height direction, the liquid level of DME is favorably below the flow path of fluorocarbon and above a lower portion of a shell-side inner wall in the heat exchanger 3. This is to cause the flow path of fluorocarbon and the DME gas to efficiently come in contact with each other to increase the heat exchange efficiency, and to cause the DME gas to be mixed with the liquefied DME to be discharged as little as possible. Further, the liquid level of DME is favorably above the flow path of fluorocarbon and below an upper portion of the shell-side inner wall in the heat exchanger 4. This is to cause the flow path of fluorocarbon and the liquefied DME to efficiently come in contact with each other to increase the heat exchange efficiency, and to cause the liquefied DME to be mixed with the DME gas to be discharged as little as possible.

Further, in a cycle of DME in a conventional method, operation efficiency is improved as a temperature difference between an evaporation portion and a condensation portion is made smaller. However, if the temperature difference is decreased, the degree of supercooling after condensation becomes small, and thus DME is more likely to be discharged as two-phase flow, and appropriate continuous operation in the condition of the low-temperature difference where the operation is highly efficient is difficult, considering an error of measuring equipment. In contrast, in the embodiment of the present invention, the phase change amount of DME is passively determined according to the amount of heat held by the supplied high or low-temperature fluorocarbon. Therefore, operation control of the entire device is easy.

As another embodiment of the present invention, there is a water-containing sludge volume reduction device. The sludge as an object in the present embodiment includes a mixture of oil, silt, and water, which occurs at the time of purification of oil-polluted water mixed with oil. Typically, the sludge occurring in water treatment is processed as industrial waste, and is thus dehydrated using a mechanical dehydration machine such as a belt press for reduction of disposal cost. However, a ratio of moisture after the dehydration is about 70%, and water still consists mostly of the dehydrated sludge. The sludge volume reduction device of the present invention can further individually remove the moisture and the oil from the dehydrated sludge. Therefore, sludge treatment cost can be reduced by reduction of sludge weight, and the oil contained in the oil-polluted water can be independently collected. Therefore, collection of resources can also be realized if the oil is variables.

Hereinafter, a configuration of the sludge volume reduction device of the present invention will be described using FIG. 1 again. The circulation cycle of DME and the circulation cycle of fluorocarbon in the sludge volume reduction device are equivalent to those of the activated carbon regeneration device of the above embodiment. A substance filled in the treatment tank 2 being the sludge, instead of used activated carbon, is different.

In a case where the object to be treated is the sludge, oil and water stagnate on the shell-side of the heat exchanger 3 as the DME is circulated. When treatment by the circulation of DME is completed, silt remains in the treatment tank 2. When the temperature is increased or the pressure is reduced in this state, water and oil are extracted in the shell-side lower portion of the heat exchanger 3, and are thus discharged from the lower portion of the shell. Meanwhile, silt containing almost no moisture and oil can be collected from the treatment tank 2.

Further, in a conventional method, decompression with an expansion valve is performed in an evaporation path of liquefied DME, and thus water and oil extracted at the time of passage of the expansion valve are more likely to become droplets and become emulsion. Once the water and oil form emulsion, gravity separation of water and oil cannot be easily performed. However, in the present invention, the liquefied DME is evaporated by heat provided in the heat exchanger 3, and thus the evaporation proceeds in a more moderate state than the evaporation by pressure drop. Therefore, emulsion is less likely to be formed, and water and oil can be easily separated.

Figure 2:
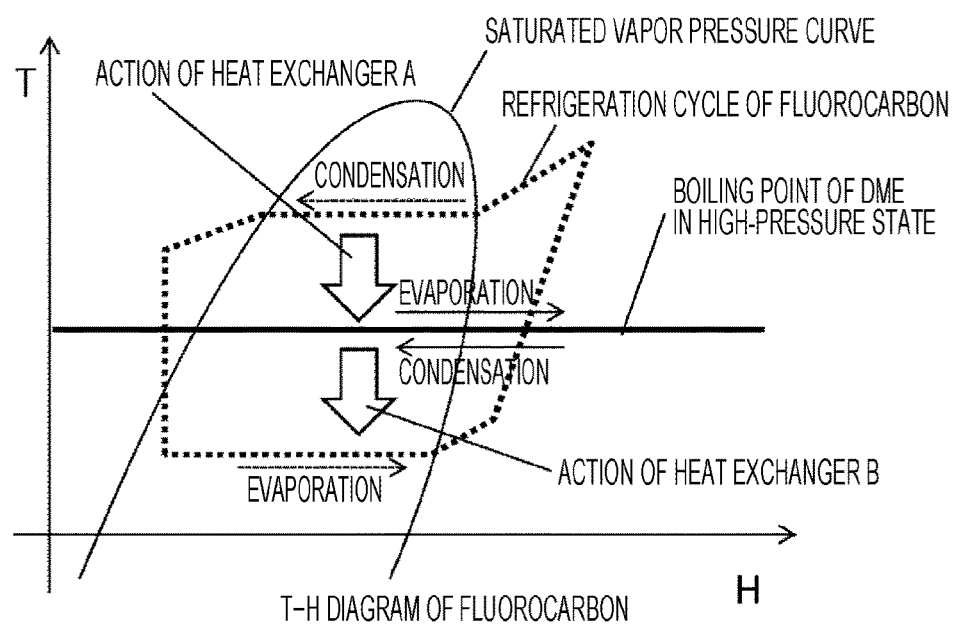
FIG. 2 is an example of a temperature-entropy diagram (T-H diagram) illustrating phase change of two types of substances used in the present invention.

FIG. 2 is a diagram illustrating a relationship between a T-H diagram illustrating a cycle of fluorocarbon and the temperature of DME at the time of operation, used in the present invention. Fluorocarbon goes through processes of compression, condensation, expansion, and evaporation, similarly to a normal refrigeration cycle. Among the processes, a large amount of latent heat occurs in the condensation process, and is thus transferred to DME at a lower temperature and is used as heat of evaporation of DME. Further, fluorocarbon in the evaporation process needs evaporation latent heat, and thus receives heat of condensation of the higher-temperature DME gas. The pressure of DME at this time is saturated vapor pressure at that temperature, except a pressure loss at the time of circulation, and is nearly constant on a continuous basis. To perform a phase change cycle of such DME, the present invention uses temperature change rather than pressure change, and thus does not need to use a special compressor for the expensive organic gas, and can circulate DME only with the gravity, as described in the first embodiment.

In the present invention, the amounts of circulation are designed and controlled such that, in both DME and fluorocarbon, the latent heat rather than the sensible heat consists mostly of the amounts of heat transferred in the heat exchanger 3 and the heat exchanger 4, that is, the latent heat of both the substance A and the substance B becomes equal. This is because the heat transfer efficiency at the time of boiling and condensation is substantially higher than the heat transfer efficiency of the gas and the liquid, and this is to improve the heat exchange efficiency and to contribute to downsizing of the heat exchangers. Further, the refrigeration cycle of fluorocarbon in this condition can make a temperature difference small, unlike air conditioners. The temperature in the condensation process may just be made slightly higher than the boiling point of DME, and the temperature of the evaporation process may just be made slightly lower than the boiling point of DME. Therefore, a loss at the time of compression necessary for circulation of fluorocarbon can be suppressed.

In the activated carbon regeneration device of the present invention, the phase change cycle of DME can be circulated a plurality of times. This is because the degree of solubility to the liquefied DME differs depending on a substance, and a substance that is not completely mixed with the liquefied DME exists. Highly-pure DME is continuously supplied through circulation of DME to sufficiently dissolve the substance with a low degree of solubility, thereby to improve removal efficiency of impurities.

The present invention is characterized by use of a temperature difference for the phase change cycle of DME and use of the gravity for the circulation. In a case of using a compressor, like a prior technology, an oil-free compressor needs to be selected. In a typical compressor, oil for lubrication of the compressor is mixed with refrigerant. In the phase change cycle of DME, the oil is separated at the time of evaporation of DME and stagnates in the middle of the cycle, and thus cannot be used in the present invention. Further, examples of types of the oil-free compressor include a turbo refrigerator, a screw refrigerator, and a reciprocating refrigerator. However, the former two types have a gap in a partition wall between a high-pressure portion and a low-pressure portion and leakage occurs, and thus a lower-limit treatment amount is large. Further, the latter type includes a sealant in a slide portion, and thus has a problem of high maintenance frequency due to abrasion. Therefore, no commercially appropriate compressors exist. In contrast, the present invention does not need a circulation device, and thus the configuration of the present invention can be easily performed.

Second Embodiment

Figure 3:
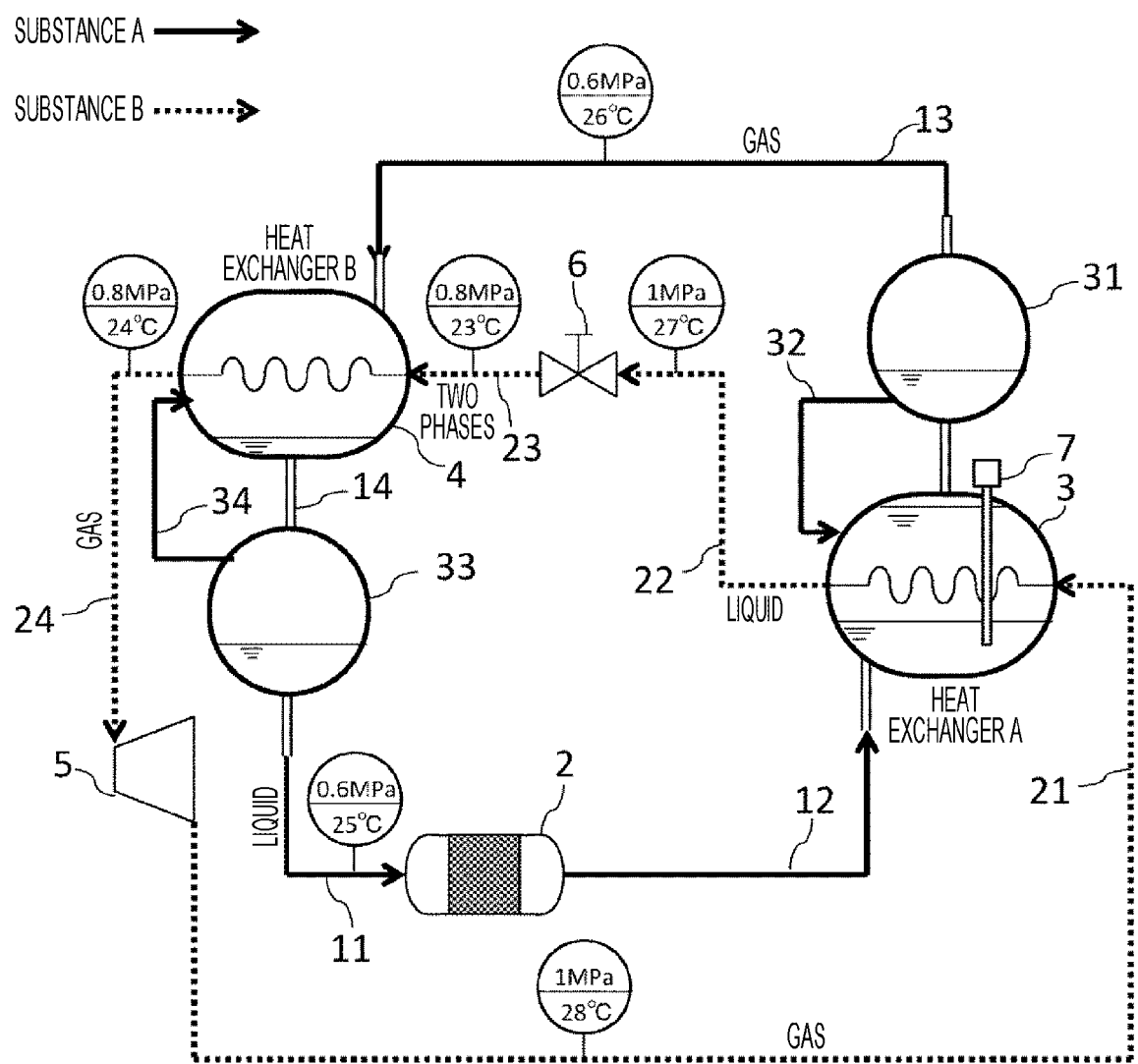
FIG. 3 is another embodiment of a configuration diagram of a solid-liquid separation device of the present invention.

An activated carbon regeneration device of another embodiment of the present invention will be described using FIG. 3. The present embodiment is different from the embodiment of FIG. 1 in that gas-liquid separators are respectively installed downstream of two heat exchanges on a circulation path of a substance A (DME).

A gas-liquid separator 31 is installed in an upper portion of and downstream of a heat exchanger 3, and a return flow path 32 through which liquefied DME is returned to the heat exchanger 3 or piping 12 is installed in a lower portion of the gas-liquid separator 31. With this configuration, in a case where DME discharged from the heat exchanger 3 is a mixture of a gas and a liquid, the mixture is separated into the gas and the liquid in the gas-liquid separator 31, and a DME gas is discharged to piping 13 and the liquefied DME is returned to the heat exchanger 3 through the return flow path 32. Further, a gas-liquid separator 33 is installed in a lower portion of and downstream of a heat exchanger 4, and a return flow path 34 through which the DME gas is returned to the heat exchanger 4 or the piping 13 is installed in an upper portion of the gas-liquid separator 33. With this configuration, in a case where DME discharged from the heat exchanger 4 is a mixture of a gas and a liquid, the mixture is separated into the gas and the liquid in the gas-liquid separator 33, and the liquefied DME is discharged to piping 11 and the DME gas is returned to the heat exchanger 3 through the return flow path 34. Therefore, the DME flow path of the piping 11, 12, and 13 that connect the two heat exchangers can maintain an appropriate phase state on a continuous basis, and the objects to be separated such as water and oil are not mixed into the piping 13. Therefore, an efficient solid-liquid separation can be realized.

With existence of the above configurations, setting of a liquid level of DME to an appropriate position in the heat exchanger is not necessary, and thus the operation is easy. Further, a heat exchanger, a liquid level of which is difficult to control, like a plate heat exchanger, can also be used as an embodiment of the present invention.

Further, in the above embodiment, the circulation of DME is natural circulation by gravity. However, in a case where a pressure loss of the piping or a pressure loss in passing through the treatment tank is large, a DME pump may be added. In this case, the pump is installed in a lower portion of the two heat exchangers in a vertical direction, thereby to be easily started.

In the above-described embodiments, DME has been used as the substance A that is a regeneration medium of activated carbon and volume reduction means of the sludge. However, a similar effect can be achieved with a substance such as ethyl methyl ether, formaldehyde, ketene, or acetaldehyde.

Further, fluorocarbon has been used as the substance B in the heat source-side refrigeration cycle used in the present invention. However, a similar effect can be achieved with a refrigerant such as ammonia or isobutane.

Further, regarding the temperatures and pressures written in the drawings, the temperatures of DME are determined on the basis of an ambient temperature of the device, and the pressures of DME are saturated vapor pressures in the temperatures. Further, the condensation temperature and the evaporation temperature of the fluorocarbon cycle are determined on the basis of the temperatures of DME.

Therefore, the numerical values in the drawings are examples for description, and are changed depending on an operation condition and an environment. Therefore, the present invention is not limited to these values.

Further, at the time of start and termination of the operation, input/collection of activated carbon to/from the treatment tank 2 is necessary. At this time, the input/collection may be performed in an open state after the operation of the activated carbon regeneration device is stopped. However, an activated carbon-filled column installed in the water treatment line may be detached from the water treatment line with a valve and connected to the circulation line of DME, thereby to be used as a substitution of the treatment tank 2.

Note that the present invention is not limited to the above-described embodiments, and includes various modifications. For example, the above embodiments have been given in detail to describe the present invention in ways easy to understand, and the present invention is not necessarily limited to one provided with all the described configurations. Further, a part of a configuration of a certain embodiment can be replaced with a configuration of another embodiment, and a configuration of another embodiment can be added to a configuration of a certain embodiment. Further, another embodiment can be added to/deleted from/ replaced with a part of a configuration of the embodiments.

REFERENCE SIGNS LIST

2 treatment tank
3 heat exchanger A
4 heat exchanger B
5 compressor
6 expansion valve

The invention claimed is:

1. A solid-liquid separation device that performs a cleaning process of an activated carbon, the solid-liquid separation device comprising:
   a first heat exchanger that is configured to:
      store organic matter, water and a substance A that is capable of dissolving water and oil, wherein substance A is stored at a first liquid level that is above in a vertical direction a first flow path of a substance B into the first heat exchanger, and
      evaporate a portion of the substance A stored in the first heat exchanger to form an evaporated substance A by exchanging a heat of condensation of a substance B and a heat of evaporation of the substance A;
   a second heat exchanger that has a center of mass that is higher in the vertical direction than a center of mass of the first heat exchanger, wherein the second heat exchanger is configured to:
      receive the evaporated substance A from the first heat exchanger,
      condense the evaporated substance A to form a condensed substance A by exchanging a heat of evaporation of the substance B and a heat of condensation of the substance A, and
      store the condensed substance A at a second liquid level that is below in the vertical direction a second flow path of the substance B into the second heat exchanger;
   a treatment tank that is configured to:
      receive a portion of the condensed substance A from the second heat exchanger,
      mix the condensed substance A with the activated carbon to form a mixture of the organic matter, the water and the substance A, and
      flow the organic matter, the water and the substance A to the first exchanger; and
   a liquid level sensor that is configured to:
      measure a level of the water in the first heat exchanger, and
      determine a completion of the cleaning process of the activated carbon based on the level of the water measured in the first heat exchanger;
   wherein the first heat exchanger and the second heat exchanger are positioned to overlap so that the first liquid level and the second liquid level tend to equalize in the vertical direction with respect to a common reference point when the cleaning process of the activated carbon is performed.

2. The solid-liquid separation device according to claim 1, wherein
   a flow path of the substance B is installed below the first liquid level.

3. The solid-liquid separation device according to claim 1, wherein
   a flow path of the substance B is installed above the second liquid level.

4. The solid-liquid separation device according to claim 1, further comprising:
   a gas-liquid separator that is installed in an upper portion of the first heat exchanger, wherein the gas-liquid separator extracts the evaporated substance A from a remainder of liquids stored in the first heat exchanger.

5. The solid-liquid separation device according to claim 1, further comprising:
   a gas-liquid separator that is installed in a lower portion of the second heat exchanger, wherein the gas-liquid separator extracts the evaporated substance A from a remainder of liquids stored in the second heat exchanger.

6. A solid-liquid separation method of performing a cleaning process of an activated carbon using the solid-liquid separation device of claim 1, the solid-liquid separation method comprising:
   providing the substance B in a closed system comprising the first flow path of the substance B and the second flow path of the substance B;
   compressing the substance B;
   exchanging the heat of condensation of the substance B and the heat of evaporation of the stored substance A within the first heat exchanger to obtain a condensed substance B;
   decompressing the condensed substance B;
   exchanging the heat of evaporation of the substance B and the heat of condensation of the substance A within the second heat exchanger to obtain the condensed substance A; and
   mixing the condensed substance A with the activated carbon in the treatment tank, wherein the stored substance A is evaporated while being separated from the water and the organic matter in the first heat exchanger, and the evaporated substance A is condensed in the second heat exchanger; and
   positioning the first heat exchanger and the second heat exchanger such that the center of mass of the first heat exchanger is lower than the center of mass of the second heat exchanger in a vertical direction,
   wherein the first heat exchanger and the second heat exchanger are positioned to overlap such that the first liquid level and the second liquid level tend to equalize in the vertical direction with respect to a common reference point when the cleaning process of the activated carbon is performed.

7. The solid-liquid separation method according to claim 6, wherein
   the flow path of the substance B into the first heat exchanger is installed below the first liquid level of the substance A in the first heat exchanger.

8. The solid-liquid separation method according to claim 6, wherein the flow path of the substance B into the second heat exchanger is installed above the second liquid level of the substance A in the second heat exchanger.

9. The solid-liquid separation method according to claim 6, wherein
a gas-liquid separator is installed in an upper portion of the first heat exchanger and downstream of a flow path of the evaporated substance A in the first heat exchanger.

10. The solid-liquid separation method according to claim 6, wherein
a gas-liquid separator is installed in a lower portion of the second heat exchanger and downstream of a flow path of the substance A that is condensed within the second heat exchanger.

* * * * *